Sept. 22, 1964     W. S. PARDEE     3,149,661
TIRE REMOVAL TOOL
Filed Aug. 29, 1961
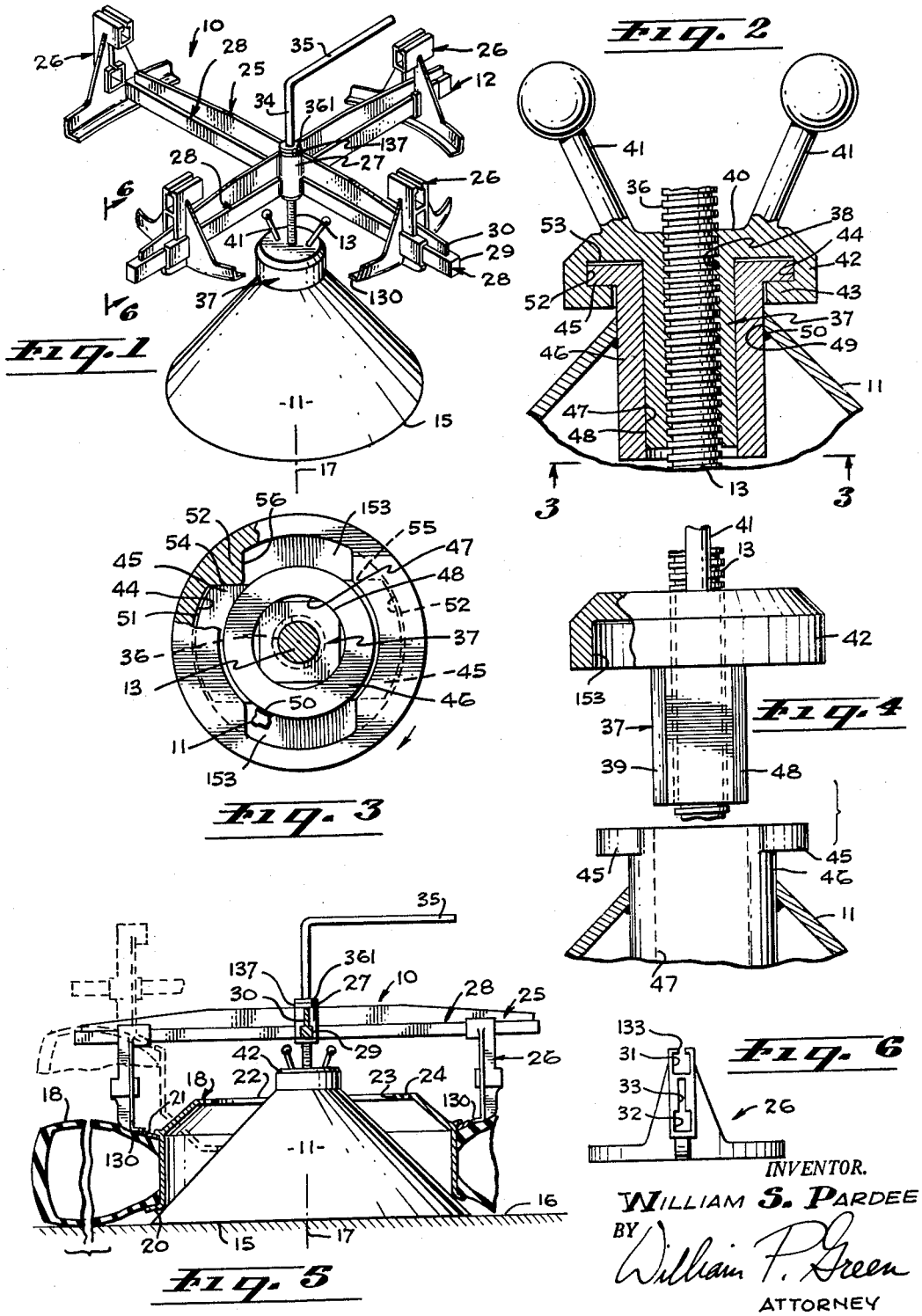
INVENTOR.
WILLIAM S. PARDEE
BY
ATTORNEY

United States Patent Office 3,149,661
Patented Sept. 22, 1964

3,149,661
TIRE REMOVAL TOOL
William S. Pardee, 22925 Ostronic Drive,
Woodland Hills, Calif.
Filed Aug. 29, 1961, Ser. No. 134,623
9 Claims. (Cl. 157—1.2)

This invention relates to an improved tool for removing a tire from a vehicle wheel, the tool being particularly useful for removing a tire from a wheel of the type conventionally used on trucks.

Tools embodying the invention are of a type including two sections, one of which engages a wheel and retains it against axial movement, and the other of which then exerts axial force against a tire on the wheel to detach the tire from the wheel. The tire holding section is preferably an upwardly tapering base structure on which the wheel may be supported in an upwardly facing position. The tire displacing section of the device may then be located above the wheel, and preferably consists of a body structure carrying a plurality of shoes at different circularly spaced locations, which shoes engage and bear against the tire. The actuating means for shifting the tire displacing section relative to the wheel holding section may consist of a screw element and a nut element, acting to press the tire axially in response to relative rotation of these parts.

In using a device of the above discussed type, the wheel is first positioned on the wheel holding section in a manner such that the shoes or other tire engaging elements may bear against a first side wall of the tire; and after that side has been properly broken away from the wheel, the wheel is reversed in position so that the second side of the tire may be engaged and displaced by the shoes or other tire engaging elements. A particular feature of novelty of the invention resides in a unique arrangement for greatly facilitating such reversal of the positioning of the tire and wheel relative to the wheel holding section of the device. More particularly, a unit embodying the invention is preferably so constructed that the tire displacing section of the device may be completely detached from the wheel holding section without the necessity for detaching the screw element from the engaging nut. Since the screw is usually of relatively great length, and takes many turns for complete detachment from the nut, this feature is of considerable practical importance in minimizing the time required for removal of a tire from a wheel. To eliminate the necessity for such unthreading of the screw and nut, I provide a quickly detachable connection between one of these parts and one of the sections of the apparatus, that is, either the wheel holding section or the tire engaging section, so that by breaking this connection the two sections can be completely separated from one another, to leave the path open for removal of the wheel and tire from the device. Preferably, the quick release connection is essentially a bayonet type connection, adapted to be made and broken by relative rotation of the connected parts through a limited circular distance. Also, it is found preferable that the quick release connection be formed between the nut element and the tire holding section of the device.

When the wheel and tire are inverted relative to the wheel holding section, from a first position to a second reversed position, it is desirable that the shoes employed on the tire engaging section of the apparatus be of a different length for the second position of the wheel and tire than for their first position. This is due to the fact that the wheel is not symmetrical, and projects from the wheel holding structure different distances in the two different positions of the wheel. In prior arrangements, this problem has been solved by providing two different sets of shoes for engagement with the tire.

Another object of the present invention is to provide a single set of shoes that will serve for engaging both sides of the tire. For this purpose, the shoes may be mounted to the body of the tire engaging section in either of two different positions, preferably by providing two different apertures in each shoe for receiving a mounting arm in two different positions.

The above and other features and objects of the present invention will be better understood from the following detailed description of the typical embodiment illustrated in the accompanying drawing in which:

FIG. 1 is a perspective view of a tire removing tool constructed in accordance with the invention, showing one of the shoes slightly separated from the rest of the tool to illustrate better the configuration of the parts;

FIG. 2 is an enlarged fragmentary axial section through the quick release connection of the FIG. 1 device;

FIG. 3 is a view taken on line 3—3 of FIG. 2;

FIG. 4 is a view similar to FIG. 2, but shown in elevation, and illustrating the nut in its detached condition;

FIG. 5 is a side view, partially in section, illustrating the manner of use of the tool; and FIG. 6 is a view taken on line 6—6 of FIG. 1.

Referring first to FIG. 1, the illustrated tool 10 constructed in accordance with the invention includes a wheel supporting base 11, a tire engaging section positioned above the base, and a screw 13 and interengaging nut 37 for actuating the tire engaging section 12 downwardly relative to base 11.

The base 11 takes the form of an upwardly tapering rigid cone, typically formed of sheet metal, whose lower edge 15 may rest on a horizontal floor or support surface 16 (see FIG. 5). In this position, the cone is centered about an axis 17 which desirably extends directly vertically. Cone 11 supports wheel 18 which carries a tire 19 to be detached from the wheel. The wheel is illustrated as being of the type utilized on trucks, having a permanent flange 20 formed at one side of the wheel and having a removable flange or ring 21 formed at the other axial side of the wheel. The wheel is adapted to be connected to a wheel hub of a truck or other motor vehicle by means of a radially inwardly extending annular flange 22 formed on the wheel at one axial side thereof. This flange 22 contains a central aperture 23, about which there are of course provided small apertures 24 for receiving the wheel mounting studs of the vehicle.

The tire engaging section 12 of the device includes a body section 25 carrying four typically identical shoes 26. Body 25 has a central vertically extending essentially tubular portion 27, from which four integral shoe mounting arms 28 project horizontally at locations spaced 90° apart. Arms 28 may be identical, and have lower portions 29 (FIG. 3) of horizontal cross-section, with reenforcing ribs 30 of narrower cross-section projecting upwardly above portions 29. Each shoe 26 may have a vertically extending portion 29 which is typically curved arcuately about the main vertical axis 17 of the device, and which carries an integral horizontally extending flange 130 at its lower end projecting horizontally toward axis 17, and curving arcuately about that axis. These bottom flanges 30 of the various shoes lie in a common horizontal plane, and are adapted to engage the upwardly facing side wall of tire 19 just outwardly of the wheel flange 20 or wheel flange 21, to press downwardly against the tire. As seen best in FIG. 6, each shoe has portions forming two vertically spaced upper and lower horizontal guide ways 31 and 32, each of the same horizontal cross-section as is rectangular portion 29 of the various shoe mounting arms 28, so that the arms are receivable within either of the two guide ways 31 or 32, to mount the shoes in either of two vertically offset positions. When one of the arms 28 is received in guide way 32 of one of the shoes, the upper re-enforcing portion 30 of arm 28 is receivable within a narrow slot 33 formed above guide way 32. When arm 28 is received within upper guide way 31, the re-enforcing web 30 projects upwardly through a top slot or gap 133 formed in the top wall of guide way 31. As will be apparent, the engagement of arms 28 within apertures 31 and 32 is such as to mount the shoes for sliding movement radially of main axis 17, while confining the shoes against movement relative to the arms in any other direction.

Screw 13 extends vertically along axis 17, and projects upwardly through a vertical passageway in central portion 27 of the shoe mounting body 25. The portion of the screw which is received within portion 27 of body 25 is desirably unthreaded, and is journalled within portion 27 for relative rotation. Above portion 27, the screw projects upwardly at 34, along axis 17, and then is turned horizontally and radially outwardly at 35 to form a handle by which the screw may be turned with substantial torque about axis 17. To transmit downward forces from screw 13 to body 25, the screw element rigidly carries an annular flange or washer 361 at a location above portion 27 of body 25, which flange limits upward movement of a thrust bearing 137, which in turn engages the upper surface of portion 27 of body 25 to prevent upward movement thereof relative to the screw.

Beneath body 25, screw 13 is externally threaded at 36, and engages a nut element 37 having internal threads 38 mating with threads 36 of the screw. Nut 37 has a tubular vertically extending portion 39 within which threads 38 are formed, and carrying a laterally projecting integral upper flange 40 to which two upwardly diverging actuating handles 41 are connected at diametrically opposite locations. At the periphery of flange 40, there is formed a depending skirt 42, at whose lower edge the nut part 37 is turned inwardly at 43 to form two recesses 44 forming a bayonet type quick detachable connection with two lugs 45 formed at the upper end of a part 46.

Part 46 may be considered as a vertically extending tubular element, containing an inner cylindrical bore 47 within which the external essentially cylindrical surface 48 of nut part 37 is closely confined and is rotatably movable. The main tubular portion of element 46 extends vertically through a top aperture 49 formed in cone 11, and is rigidly secured to the cone as by welding represented at 50. As seen best in FIG. 3, the two diametrically oppositely projecting lugs 45 on part 46 have outer arcuate surfaces 51 of a diameter corresponding to that of cylindrical vertical wall 52 of recess 44 in part 37. This cylindrical wall 52 is circularly continuous about axis 17, except at the location of a stop lug 52, having the horizontal cross-section illustrated in FIG. 3, and which lug extends downwardly from top horizontal annular wall 53 of recess 44 to one of the two inturned bottom wall portions 43 of that recess. Between these two bottom wall portions 43, there are formed two diametrically opposed apertures 153, having arcuate horizontal cross-sections corresponding substantially to the cross-sections of lugs 45, and through which lugs 45 may pass upwardly relative to nut 37 and past flanges 43. After such reception of lugs 45 within the interior of the upper connector portion of nut element 37, the nut may be turned relative to part 46 and its lugs 45, in a counterclockwise direction as viewed in FIG. 3, to rotate lugs 45 through 90 circular degrees into recesses 44, to thereby form a rigid connection between nut 37 and the base structure. In this fully secured condition of the quickly detachable connection, one of the lugs engages stop element 52 at 54 to limit the rotary movement. In order to detach the parts, the nut is turned in the reverse direction, until the surface 55 on the other lug 45 engages side 56 of element 52 to indicate that lugs 45 are in positions of alignment with apertures 153, so that the nut may be easily removed upwardly.

To now describe briefly a complete tire removing operation performed with the tool illustrated in the drawing, assume first of all that the quick detachable bayonet connection between parts 37 and 46 is broken, and that the screw and threadedly engaged nut 37, as well as the attached tire engaging section 12, are all completely detached from cone 11. With the apparatus in this condition, wheel 18 and tire 19 are mounted on cone 11 in the position illustrated in full lines in FIG. 5. The screw 13, nut 37, and attached parts, are then all moved into position as shown in FIG. 5, with shoes 26 in the lower of their two possible positions relative to body 25. Portion 39 of nut 37 is slipped downwardly into part 46, to pass lugs 45 through apertures 153 and into the interior of the upper portion of the nut, following which the nut is turned through 90 degrees to the locked position of FIG. 3, in which the nut is securely retained in fixed position relative to cone 11. Screw 13 is then turned by handle 35 in clockwise direction, to advance the screw downwardly relative to the nut, and thereby cause shoes 26 to press tightly against the upper wall of tire 19, and ultimately break that tire loose from detachable top ring 21 of the wheel. This allows the top ring to be easily removed from the wheel.

After such removal of the top ring, nut 37 is turned by handles 41 in a direction to release the quick detachable connection, and permit upward withdrawal of the nut, screw, and attached part, so that the wheel may then be inverted to the broken line position of FIG. 5, in which flange 23 annularly engages and is supported by cone 11, by engagement of the inner edge of flange 22, at the location of opening 23, with the cone. This type of support of the wheel necessarily positions the tire 19 substantially above its initial position. Consequently, shoes 26 are now shifted to their upper positions relative to body 25, as seen in FIG. 1, and the nut, screw, and attached parts are again connected to the cone by means of the bayonet connection. The screw may then be turned in a clockwise direction again, to force the shoes downwardly against the second side of the tire, and break that second side loose from flange 20, so that further actuation of the screw may force the tire downwardly completely off of the wheel.

With further regard to the structure of the bayonet connection between parts 37 and 46, it is noted that this connection should be so designed as to be made up by rotation of nut 37 in the same direction in which screw 13 turns when the latter is advancing the shoes downwardly. Thus, the tire displacing action of the screw can not unintentionally release the quick detachable connection which holds the nut.

I claim:

1. A tool for removing a tire from a truck type vehicle wheel, comprising a base section adapted to support said wheel in two different relatively inverted conditions, with either of the two sides of the wheel facing upwardly, but with the wheel positioned essentially higher when one side is up than when the other side is up, a vertically movable body section detachably connectible to said base section, a plurality of shoes carried by said body section for exerting force downwardly against said tire in either of said two relatively inverted conditions, means for connecting said shoes detachably to said body section in either of two different vertically adjusted positions of the shoes relative to said body section, to thereby engage the tire at different elevations when the wheel is in its two different relatively inverted conditions, two interengaging threaded elements operable upon relative rotation to force said body section and its carried shoes downwardly relative to said base section to displace a side wall of the tire, means connecting one of said threaded elements to one of said sections, and a quickly detachable connection removably attaching the other of said elements to the other section and releasable to permit separation of the sections for removal and inverting of the wheel without complete relative unthreading of said elements.

2. A tool for removing a tire from a truck type vehicle wheel, comprising a base section adapted to support said wheel in two different relatively inverted conditions, with either of the two sides of the wheel facing upwardly, but with the wheel positioned essentially higher when one side is up than when the other side is up, a vertically movable body section detachably connectible to said base section, a plurality of shoes carried by said body section for exerting force downwardly against said tire in either of said two relatively inverted conditions, means for connecting said shoes detachably to said body section in either of two different vertically adjusted positions of the shoes relative to said body section, to thereby engage the tire at different elevations when the wheel is in its two different relatively inverted conditions, two interengaging threaded elements operable upon relative rotation to force said body section and its carried shoes downwardly relative to said base section to displace a side wall of the tire, means connecting one of said threaded elements to one of said sections, and a quickly detachable connection removably attaching the other of said elements to the other section and releasable to permit separation of the sections for removal and inverting of the wheel without complete relative unthreading of said elements, said base section having an upwardly tapering upper surface for engaging and supporting any of a plurality of different sizes of wheels, in said two different relatively inverted conditions.

3. A tool for removing a tire from a truck type vehicle wheel, comprising a base section adapted to support said wheel in two different relatively inverted conditions, with either of the two sides of the wheel facing upwardly, but with the wheel positioned essentially higher when one side is up than when the other side is up, a vertically movable body section detachably connectible to said base section and having arms projecting in different directions, a plurality of shoes carried by said body section for exerting force downwardly against said tire in either of said two relatively inverted conditions, means for connecting said shoes detachably to said arms respectively of the body section for horizontal shifting movement therealong and with each shoe positionable in either of two different vertically adjusted positions relative to said body section, to thereby engage the tire at different elevations when the wheel is in its two different relatively inverted conditions, two interengaging threaded elements operable upon relative rotation to force said body section and its carried shoes downwardly relative to said base section to displace a side wall of the tire, means connecting one of said threaded elements to one of said sections, and a quickly detachable connection removably attaching the other of said elements to the other section and releasable to permit separation of the sections for removal and inverting of the wheel without complete relative unthreading of said elements.

4. A tool for removing a tire from a truck type vehicle wheel, comprising a base section adapted to support said wheel in two different relatively inverted conditions, with either of the two sides of the wheel facing upwardly, but with the wheel positioned essentially higher when one side is up than when the other side is up, a vertically movable body section detachably connectible to said base section, a plurality of shoes carried by said body section for exerting force downwardly against said tire in either of said two relatively inverted conditions, means for connecting said shoes detachably to said body section in either of two different vertically adjusted positions of the shoes relative to said body section, to thereby engage the tire at different elevations when the wheel is in its two different relatively inverted conditions, a vertically extending threaded screw rotatably connected to said body section, a nut threadedly engaging said screw and operable with the screw to force said body section and its carried shoes downwardly relative to said base section to displace a side wall of the tire, and a quickly detachable connection removably attaching said nut to said base section and releasable to permit separation of the sections for removal and inverting of the wheel without complete relative unthreading of said screw and nut.

5. A tool for removing a tire from a truck type vehicle wheel, comprising a base section adapted to support said wheel in two different relatively inverted conditions, with either of the two sides of the wheel facing upwardly, but with the wheel positioned essentially higher when one side is up than when the other side is up, a vertically movable body section detachably connectible to said base section and having arms projecting in different directions, a plurality of shoes carried by said body section for exerting force downwardly against said tire in either of said two relatively inverted conditions, means for connecting said shoes detachably to said arms respectively of the body section for horizontal shifting movement therealong and with each shoe positionable in either of two different vertically adjusted positions relative to said body section, to thereby engage the tire at different elevations when the wheel is in its two different relatively inverted conditions, said last mentioned means including two vertically spaced apertures formed in each of said shoes for slidably receiving a corresponding one of said arms in said two different vertically adjusted positions respectively of the shoe, two interengaging threaded elements operable upon relative rotation to force said body section and its carried shoes downwardly relative to said base section to displace a side wall of the tire, means connecting one of said threaded elements to one of said sections, and a quickly detachable connection removably attaching the other of said elements to the other section and releasable to permit separation of the sections for removal and inverting of the wheel without complete relative unthreading of said elements.

6. A tool for removing a tire from a truck type vehicle wheel, comprising a base section adapted to support said wheel in two different relatively inverted conditions, with either of the two sides of the wheel facing upwardly, but with the wheel positioned essentially higher when one side is up than when the other side is up, a vertically movable body section detachably connectible to said base section, a plurality of shoes carried by said body section for exerting force downwardly against said tire in either of said two relatively inverted conditions, means for connecting said shoes detachably to said body section in either of two different vertically adjusted positions of the shoes relative to said body section, to thereby engage the tire at different elevations when the wheel is in its two different relatively inverted conditions, two interengaging threaded elements operable upon relative rotation to force said body section and its carried shoes downwardly relative to said base section to displace a side wall of the tire, means connecting one of said threaded elements to one of said sections, and a quickly detachable bayonet type connection removably attaching the other of said elements to the other section and releasable to permit separation of the sections for removal and inverting of the wheel without complete relative unthreading of said elements.

7. A tool for removing a tire from a truck type vehicle wheel, comprising a base section adapted to support said wheel in two different relatively inverted conditions, with either of the two sides of the wheel facing upwardly, but with the wheel positioned essentially higher when one side is up than when the other side is up, a vertically movable body section detachably connectible to said base section and having arms projecting in different directions, a plurality of shoes carried by said body section for exerting force downwardly against said tire in either of said two relatively inverted conditions, means for connecting said shoes detachably to said arms respectively of the body section for horizontal shifting movement therealong and with each shoe positionable in either of two different vertically adjusted positions relative to said body section, to thereby engage the tire at different elevations when the wheel is in its two different relatively inverted conditions, said last mentioned means including two vertically spaced apertures formed in each of said shoes for slidably receiving a corresponding one of said arms in said two different vertically adjusted positions respectively of the shoe, a vertically extending threaded screw rotatably connected to said body section, a nut threadedly engaging said screw and operable with the screw to force said body section and its carried shoes downwardly relative to said base section to displace a side wall of the tire, and a quickly detachable bayonet type connection removably attaching said nut to said base section and releasable to permit separation of the sections for removal and inverting of the wheel without complete relative unthreading of said screw and nut, said base section having an upwardly tapering upper surface for engaging and supporting any of a plurality of different sizes of wheels in said two different relatively inverted conditions.

8. A tool for removing a tire from a vehicle wheel, comprising a base section for supporting said wheel, a vertically movable tire displacing section for exerting force downwardly against said tire to detach it from the wheel, a screw connected to said tire displacing section, a nut threadedly engaged by said screw to force the tire displacing section downwardly upon relative rotation of the screw, a connector part for removably receiving said nut and having laterally projecting lugs, and a flange formed on said nut and extending about said lugs and having recesses forming a releasable bayonet connection therewith.

9. A tool for removing a tire from a vehicle wheel, comprising a base section which tapers upwardly toward a reduced dimension end and has an outer surface adapted to engage and support any of different sizes of wheels, a vertically movable tire displacing section for exerting force downwardly against said tire to detach it from the wheel, a screw connected to said tire displacing section, a nut threadedly engaged by said screw to force the tire displacing section downwardly upon relative rotation of the screw, a connector part for removably receiving said nut and carried within said upper reduced dimension end of the tapering base section and projecting upwardly therefrom and having laterally projecting lugs, and a flange formed on said nut and extending about said lugs and having recesses forming a releasable bayonet connection therewith.

References Cited in the file of this patent

UNITED STATES PATENTS

| | | |
|---|---|---|
| 1,948,434 | Stafford et al. | Feb. 20, 1934 |
| 1,975,148 | Hassett | Oct. 2, 1934 |
| 2,512,864 | Koester | June 27, 1950 |
| 2,718,258 | Hawkinson | Sept. 20, 1955 |
| 2,792,878 | Sanford | May 21, 1957 |